United States Patent [19]
McKee

[11] Patent Number: 4,975,609
[45] Date of Patent: Dec. 4, 1990

[54] HOMOPOLAR DYNAMOELECTRIC MACHINE WITH PLURAL INDEPENDENT OUTPUTS AND IMPROVED ROTOR CONDUCTOR

[75] Inventor: Bobby D. McKee, San Jose, Calif.

[73] Assignee: Westinghouse Electric Corp., Pittsburgh, Pa.

[21] Appl. No.: 364,935

[22] Filed: Jun. 12, 1989

[51] Int. Cl.$^5$ .............................................. H02K 31/00
[52] U.S. Cl. .................................... 310/178; 310/71; 310/219; 310/248; 322/48
[58] Field of Search .................. 310/178, 102 A, 71, 310/219, 248, 232, 254, 259, 261, 265; 322/48, 54

[56] References Cited

U.S. PATENT DOCUMENTS

| | | | |
|---|---|---|---|
| 390,906 | 10/1888 | Ries . | |
| 429,729 | 6/1890 | Marvin . | |
| 550,663 | 12/1895 | Thomas . | |
| 555,590 | 3/1896 | Thomson . | |
| 559,815 | 3/1898 | Wait . | |
| 644,278 | 2/1900 | Cooley . | |
| 881,387 | 3/1908 | Eastwood . | |
| 2,852,731 | 12/1954 | Heil . | |
| 2,939,975 | 6/1960 | Richards . | |
| 3,160,772 | 12/1964 | Miron . | |
| 3,229,133 | 1/1966 | Sears | 310/178 |
| 3,909,645 | 9/1975 | Herr . | |
| 4,271,369 | 6/1981 | Stillwagon | 310/178 |
| 4,399,381 | 8/1983 | Chabrerie | 310/178 |
| 4,602,179 | 7/1986 | Kuznetson | 310/178 |
| 4,710,665 | 12/1987 | Kilgore | 310/219 |

FOREIGN PATENT DOCUMENTS

| | | | |
|---|---|---|---|
| 0658559 | 1/1965 | Belgium | 310/178 |
| 0760587 | 6/1954 | Fed. Rep. of Germany | 310/178 |
| 2753096 | 5/1979 | Fed. Rep. of Germany | 310/178 |
| 0423442 | 4/1911 | France | 310/178 |
| 0917262 | 1/1963 | United Kingdom | 310/178 |

Primary Examiner—R. Skudy
Attorney, Agent, or Firm—D. Schron

[57] ABSTRACT

A homopolar dynamoelectric machine is provided with plural independent output terminals for selectable external interconnection to yield a variable output. Each output terminal is associated with a respective pair of rotor conductor and stator conductor. Each rotor conductor and stator conductor is of a generally cylindrical shape. Each stator conductor is further comprised of two separated portions each of a generally cylindrically shape. The rotor conductors and stator conductors are arranged concentrically to each other, and all stator conductors are positioned external to all rotor conductors. The surface of each rotor and stator conductor can be skewed to provide a skewed current flow generating a magnetic field boosting that initially provided in the system. Each output terminal has two connections to each stator conductor, one on each separated portion of the corresponding stator conductor. Each such connection comprises plurals contact areas on a corresponding stator conductor. The contact areas generally evenly distributed around a cross section of the stator conductor's separated portion.

14 Claims, 3 Drawing Sheets

HOMOPOLAR DYNAMOELECTRIC MACHINE WITH PLURAL INDEPENDENT OUTPUTS AND IMPROVED ROTOR CONDUCTOR

BACKGROUND AND FIELD OF THE INVENTION

This invention relates to dynamoelectric machines and more particularly to homopolar dynamoelectric machines.

A homopolar dynamoelectric machine, when used as a generator, supplies D.C. current directly from a conductor in relative motion with respect to lines of magnetic flux and cutting such magnetic flux during that motion. That is because the polarity of the magnetic flux cut by such a surface, relative to the direction of motion of the surface with respect to the magnetic flux, does not change at any time during operation of the generator. In contrast, conventional generators based on relative motion between a magnetic field and a conductor generate D.C. current by first generating A.C. current and then converting it to D.C. current. Homopolar electrical generators more efficiently generate a larger D.C. output current than conventional generators based on D.C. output current than conventional generators based on relative motion between a conductor and a magnetic field. U.S. Pat. No. 4,710,665 naming the applicant as an inventor contains a general description of drum-type homopolar dynamoelectric machines.

Though the concept of homopolar dynamoelectric machines has been known for a long time, there has not been much activity in its further research and development. For instance, although it has been known since the last century to use multiple coils or segments of a single coil to supply plural outputs from a single A.C. to D.C. conversion type generator, no homopolar dynamoelectric machine known by the applicant has embodied the feature of having multiple output terminals independently supplying a separate output.

At least in one area of application of generators—the testing of electromagnetic gun configurations—the requirement for current is high. For that reason, homopolar generators are especially suitable for that application. However, in that application, the required current, voltage, and energy may vary quite often. The cost of having a separate generator for each different output requirement is high.

It has been known in the past to skew the current path within a none..rotating part of a homopolar dynamoelectric machine to create magnetic flux which adds to the flux originally generated by the machine to increase its efficiency. The previously mentioned U.S. Pat. No. 4,710,665 discloses one such machine. Skewing formed on a surface area generally weakens it. Because a rotating conductor may rotate at high speeds, the weakened surface area may become damaged when subjected to high centrifugal force during rotation. A stator conductor does not rotate and thus does not have this problem if its surface is skewed.

SUMMARY OF THE INVENTION

According to one aspect of this invention, a homopolar generator is constructed with plural independent output terminals which can simultaneously supply separate outputs. The separate outputs can be externally interconnected in different ways to supply a selectable output level. The output supplied from each output terminal is respectively derived from a corresponding conductor in relative motion with respect to a magnetic field. According to another aspect of this invention, the surface of a conductor for rotation in a magnetic field is skewed at a none-zero angle relative to an axis perpendicular to the conductor's direction of motion and perpendicular to the direction of magnetic flux incident on and penetrating the conductor; the skewed surface provides skewed current flow which generates an added field boosting the initially established magnetic field and a layer of support is added to the rotor conductor's surface to prevent damage to the rotor during its rotation.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION

Figure 1:
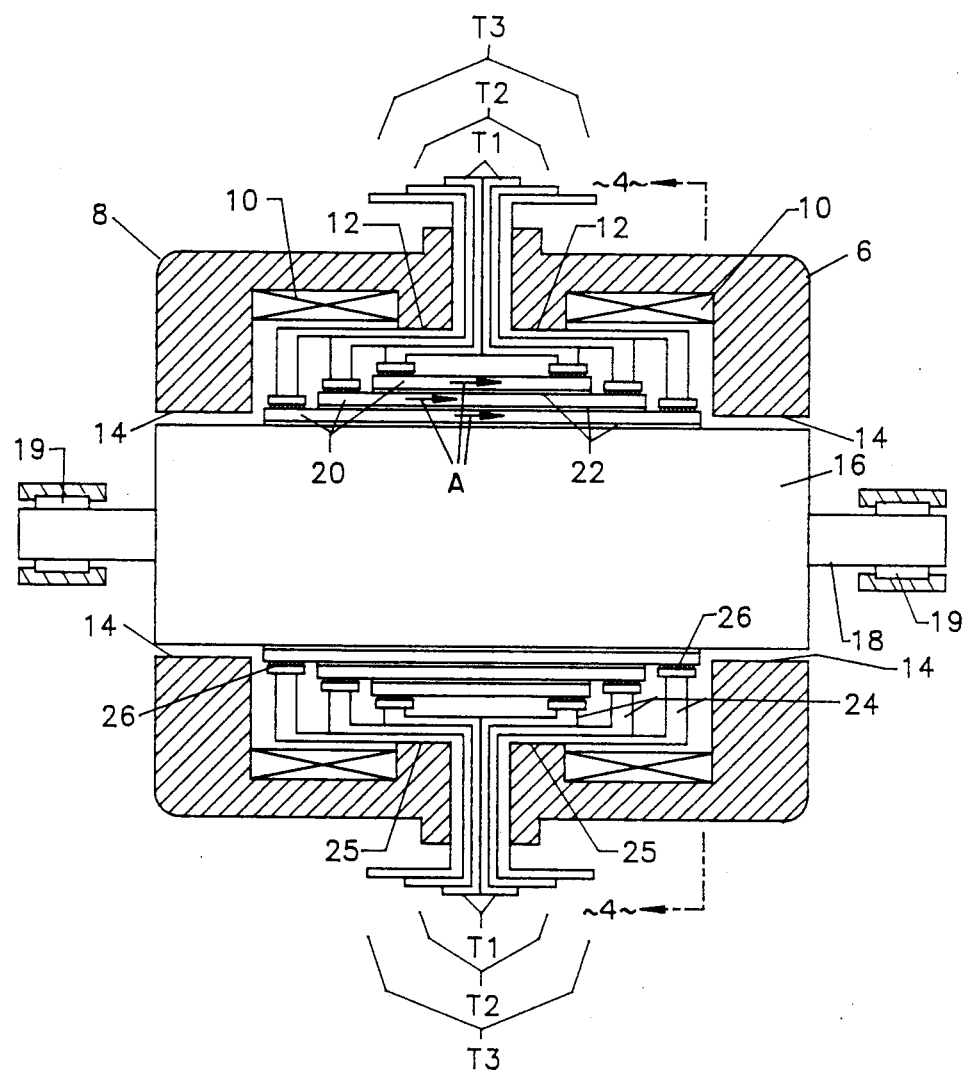
FIG. 1 illustrates a longitudinal crosssectional view of an embodiment of the present invention.

In the preferred embodiment shown in longitudinal cross-sectional view in FIG. 1, a homopolar generator is illustrated having a stator iron 2 having two parts 6 and 8, each being in the form of an annulus, and field coils 10 for generating magnetic flux. Each stator iron part cooperates with a respective field coil 10 to direct magnetic flux out of surface area 12 and back in through surface area 14. Though a stator iron and associated field coils are disclosed for generating and directing magnetic field, the present invention is not limited to any particular structure for generating the initial magnetic field; it is necessary only that such a field be present. For instance, in an alternative embodiment, permanent magnets can be used.

Within the enclosure formed by the two stator iron parts 6 and 8, a rotor 16 in the form of a rod is mounted on a shaft 18 extending therethrough. The rotor completes the magnetic circuit for each stator iron part 6 and 8. The shaft is journaled within bearings 19 and acts to impart rotational motion to the rotor. Rotor 16 is disposed within the stator iron parts in a direction generally parallel to the central axis of the annular configuration of the stator iron parts.

Also within the stator iron enclosure are a plurality of rotor conductors 20 each having a generally cylindrical shell configuration. Each rotor conductor is coaxial to and circumscribes at least one other rotor conductor 20, except for the inner most rotor conductor which is coaxial to and circumscribes the rotor 16. Thus, the geometric centers of all said rotor conductors 20 are coincident, and all said rotor conductors are simultaneously driven by said rotor into rotational motion. The rotor conductors 20 are electrically insulated from each other and also from the rotor by respective insulation layers 22 disposed therebetween.

The magnetic flux generated and directed by the stator iron and field coil assembly is incident on and penetrates the cylindrical surface of each rotor conductor 20 in a direction perpendicular to that cylindrical surface. As the rotor conductors rotate, their respective cylindrical surface cut across the perpendicularly penetrating flux lines, thus generating respective currents flowing on corresponding cylindrical surfaces in a direction parallel to the longitudinal axis of each rotor conductor. That longitudinal axis is perpendicular to the direction of magnetic flux lines penetrating the surface of the rotor conductor, and also perpendicular to the tangents of the rotational motion of the rotor conductor; in that regard, the tangents to a rotational motion define the direction of rotation. In FIG. 1, arrows A illustrates the direction of current flow passing through each rotor conductor 20. The magnetic flux originating from the surface 12 of a respective stator iron part, after penetrating the rotor conductors, continue through the rotor 16 in a direction parallel to the rotor's longitudinal axis to return to the same stator iron part through a corresponding surface 14 thereon.

The current flowing in each rotor conductor is collected at one end and returned at another end, through a stator conductor 24 associated with that rotor conductor. Each stator conductor 24 is connected to a different corresponding output terminal having a source port for supplying current from the generator and a sink port for returning current to the generator. Because each rotor conductor is connected to a different corresponding stator conductor, the currents through each rotor conductor is communicated to and from a different corresponding output terminal. Thus, the output terminals are independent of each other and can be selectively combined externally to supply a selectable output level.

Each stator conductor 24 also has a generally cylindrical shell configuration. All of the stator conductors 24 are coaxial to each other and to all the rotor conductors 20, and each stator conductor circumscribes at least one other stator conductor, except the inner most stator conductor which circumscribes all the rotor conductors. Therefore, all stator conductors 24 circumscribe all rotor conductors 20, and the geometric centers of all the rotor conductors 20 and all the stator conductors 24 are coincident. Each stator conductor 24 comprises two separated portions 25. Each of the two separated portions has a generally cylindrical shell configuration. In FIG. 1, they are shown as two half portions of equal size, though alternative embodiments may use portions of different proportions. The two shells of the separated half portions of each stator conductor together represent a single generally cylindrical shell configuration for the stator conductor, albeit separated at its mid-section. The two portions are separated along a plane perpendicular to the longitudinal axis of the stator conductor's generally cylindrical shape.

For each stator conductor 24, the two shells of its separated half portions are coaxial to and jointly circumscribe a single corresponding rotor conductor 20 from which they gather and return current. All stator conductors 24 are positioned external to all of the rotor conductors, and the stator conductors 24 are themselves electrically insulated from each other through respective insulation layers 30 which are positioned in between the layers of stator conductors (not shown). The rotor conductors are insulated from each other through respective insulation layers 22.

Each associated stator conductor and rotor conductor pair is connected by two brushes 26 disposed at opposite ends of the rotor conductor. Each brush has an annular configuration through which the rotor conductor extends. The internal surface of each brush slidingly engages the external surface of the rotor conductor and the external surface of the brush engages the interior surface of the stator conductor. The plane of each brush's annular shape cuts the rotor conductor's cylindrical shell at approximately a right angle to provide generally even current communication to and from the surface of the rotor conductor. The two brushes are connected to different stator conductor half portions 25 such that one brush is gathering current from the rotor conductor to the stator conductor and the other brush is returning current from the stator conductor to the rotor conductor. The two stator conductor half portions 25 of each stator conductor are connected to an output terminal for connecting to an external load. There are as many terminals as there are numbers of pairs of a stator conductor and an associated rotor conductor. Thus, for each output terminal, there is a corresponding stator conductor and a corresponding rotor conductor. Each output terminal also has two ports, a source port for supplying current to the load and a sink port for returning current from the load. Three output terminals are shown in FIG. 1, one for each stator conductor and rotor conductor pair.

Each output terminal comprises a plurality of subterminals which connect separately to the same stator conductor for receiving current therefrom and returning current thereto. The number of subterminals for each terminal may vary among different embodiments of the present invention, from 1 to a large number; in the embodiment shown in FIG. 1, there are two. Thus, two subterminals T1 together represent a single output terminal; two subterminals T2 together represent a second output terminal; and two subterminals T3 together represent a third output terminal. Each subterminal connects to a corresponding stator conductor 24 through two connections; one connection is on the surface of one separated half portion of the stator conductor for receiving current from that stator conductor, and the other connection is on the surface of the other separated half portion of the stator conductor for returning current to that stator conductor. Each connection may include a variable number of contact areas. If there are more than one, it is preferable that they be generally evenly distributed around a cross section of the stator conductor half portion being connected so as to effect a generally uniform current flow. Similarly, that cross section is preferably a right cross section perpendicular to the longitudinal axis of the generally cylindrical shape of the stator conductor.

The source port for each terminal comprises the contact areas in all the subterminals of that terminal, which supply current from a corresponding stator conductor. The sink port for each terminal comprises the contact areas in all the subterminals of that terminal which return current to the corresponding stator conductor.

Figure 2:
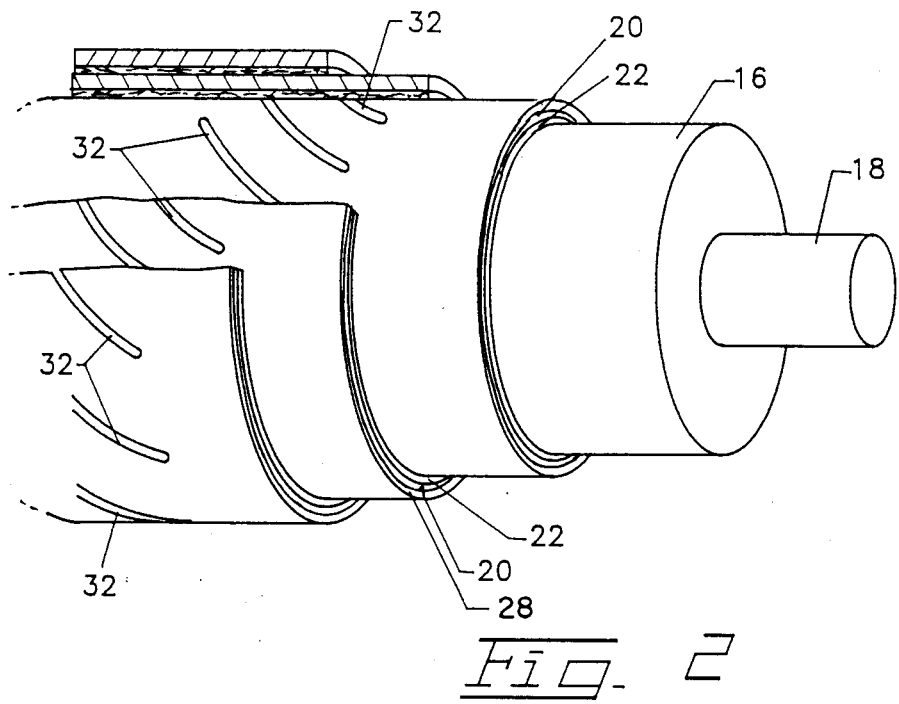
FIG. 2 illustrates a partial exploded view of the rotating parts shown in FIG. 1.

In FIG. 2, it is shown that a steel rotor 16 is mounted on shaft 18. A first rotor conductor 20 circumscribes the rotor 16 and is separated therefrom by an insulation layer 22. A second rotor conductor circumscribes the first rotor conductor and is separated therefrom by another insulation layer 22. A third rotor conductor circumscribes the second rotor conductor and is separated therefrom by a further insulation layer 22. Thus, the rotor conductors are coaxially arranged to each other. Moreover, in this preferred embodiment, each of the rotor conductors 20 have a skewed surface area for causing current to flow at a none-zero angle to the longitudinal axis of the rotor conductor; that axis is perpendicular to the direction of incidence of the magnetic flux on the cylindrical rotor conductor surface and also perpendicular to the direction of rotational motion of the rotor conductor as defined by the instantaneous tangents. Such a skewed current path generates further magnetic flux excitation adding to the flux generated by the stator iron and field coil assembly shown in FIG. 1. The effect of the added flux boosts the efficiency of magnetic flux generation in the homopolar dynamoelectric machine. Accordingly, the homopolar dynamoelectric machine of the present invention is dual-excited. In an alternative embodiment, the rotor 16 can itself serve as a rotor conductor.

The skewed surface of the rotor conductor can be achieved in several ways. As shown in FIG. 2, a plurality of slots 32 which are elongated cavities are distributed on a surface portion of each rotor conductor. The slots are generally in parallel to each other, and are collectively positioned at a none-zero angle from the longitudinal axis of the rotor conductor for skewing current flow in that direction. In the preferred embodiment, the slots are generally evenly distributed along a cross section of the rotor conductor cut along a plane generally perpendicular to the longitudinal axis of the rotor conductor. The common direction and generally even distribution of the slots effect an uniformly skewed current path on the surface of the rotor conductor. Also in this embodiment, the surface area between the slots is integrally formed with the rest of the rotor conductor surface area. In another embodiment, the surface area between the slots may be formed of separate strips not integrally formed with but attached to the rest of the rotor conductor surface area by a suitable means such as welding. In either case, however, the slotted rotor conductors conduct respective currents in a skewed path.

Because the rotor conductor is designed to rotate at high speeds, slotted surface areas on the rotor conductor can be subjected to intense centrifugal force. In typical applications, the force is sufficiently large to cause damage to the slotted areas, e.g., the area between slots may fly apart. Thus, it is desirable to add supporting structure to the slotted surface area on a rotor conductor. In a disclosed embodiment of the invention, a layer of composite filaments 28 is bound into an integral unit by epoxy, resins, or the like, and wrapped around the slotted surface area by the same to provide support for the surface area weakened by the slots. Such a composite layer can also serve as the insulating layer 22 in FIG. 1. For an embodiment including multiple rotor conductors with slotted surface area, there would be a separate layer of such composite filaments for each rotor conductor.

Figure 3:
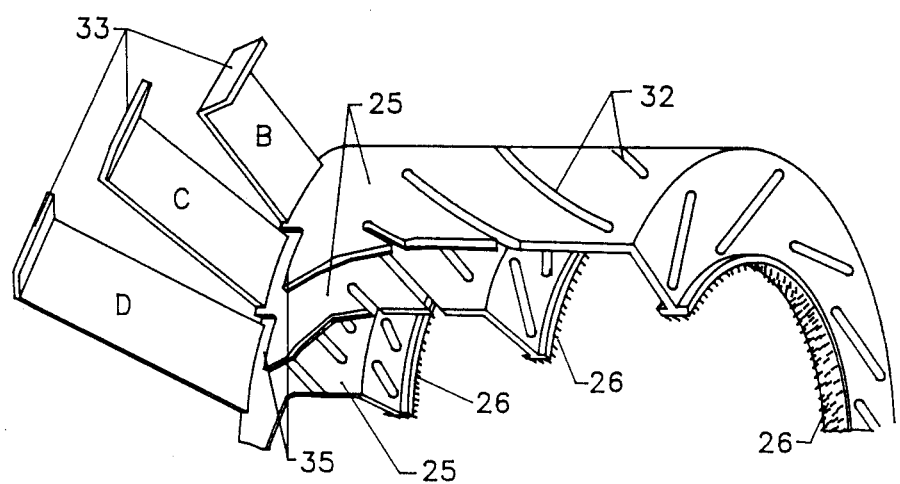
FIG. 3 illustrates a partial exploded view of the stationary components connecting the rotating parts of FIG. 2 to an external load.

A partial view of the same half portion of three stator conductors is shown in FIG. 3. A brush 26 is connected to each stator conductor half portion 25. Each stator conductor half portion has a skewed surface area formed by slotting. The effect of skewing the stator conductor surface area the formation of slots and their placement on the surface area of the stator conductor is the same as that discussed above for skewed rotor conductors. There would be no need, however, to add supporting structure to the slotted surface area on the stator conductors. The other half portion of each stator conductor has the same construction as that shown in FIG. 3.

In FIG. 3, only one subterminal is depicted for each stator conductor, represented by a respective conducting plate 33 connected to a contact area on the surface of the associated stator conductor half portion. For each such conducting plate, the corresponding conducting plate connecting to the other stator conductor half portion of the same stator conductor is not shown in FIG. 3. Nevertheless, a pair of conducting plates 33 connecting to different half portions of the same stator conductor constitutes a single subterminal corresponding to that stator conductor. The contact areas on the stator conductor half portions to which the illustrated conducting plates 33 connect are respectively referenced as B, C, and D on the corresponding conducting plates. Because all contact areas B, C, and D contact the same half portion of respective stator conductors, they all either supply current from or return current to their respectively corresponding stator conductor. Whatever is the case, their counterparts connecting to the other half portion of the same stator conductor would have the opposite function.

Because outer stator conductors circumscribe inner ones, each outer stator conductor half portion includes apertures 35 through which certain conducting plates 33 pass to connect to contact areas on corresponding stator conductor half portions circumscribed within. In the disclosed embodiment, there are as many apertures on each stator conductor as there are contact areas on stator conductors circumscribed within. However, for illustration purposes, only two such apertures are shown in FIG. 3.

Conducting plates 33 can be joined to the surface of a corresponding separated stator conductor half portion by a suitable means such as welding. Alternatively, each conducting plate 33 can be an integral extension from the surface of the corresponding separated stator conductor half portion. The number of contact areas on each separated stator conductor half portion to which a respective conducting plate 33 connects can vary, as already discussed above.

Figure 4:
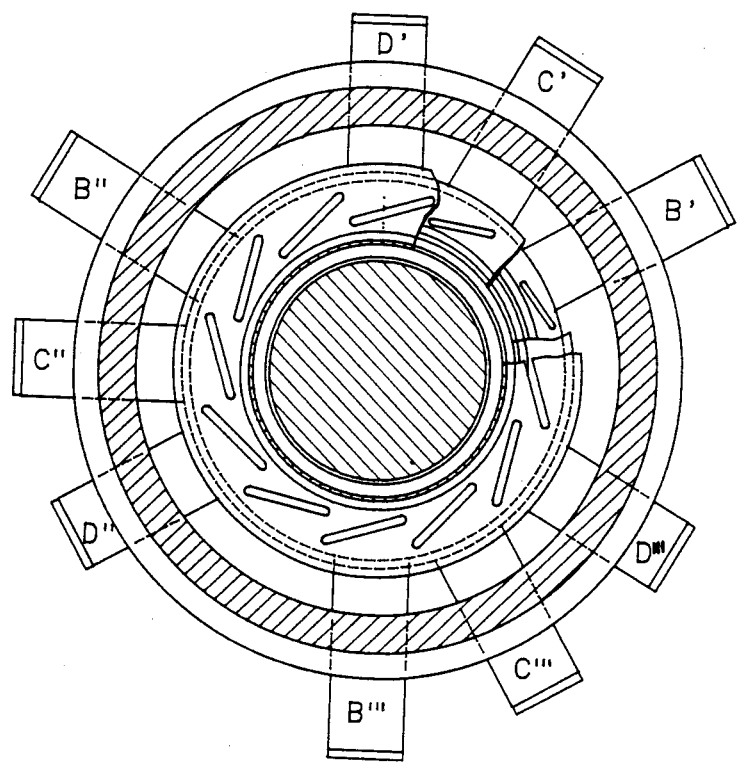
FIG. 4 illustrates a lateral cross sectional view of another embodiment of the present invention.

FIG. 4 is a partial cross sectional view of an embodiment having three rotor conductors, three stator conductors, and three contact areas on each separated stator conductor half portion. The cross section, also illustrated in FIG. 1 as No. 4, is across the same half portion of each stator, cut along a plane generally perpendicularly to the axis of each stator conductor's generally cylindrical shape. The brushes between each stator conductor and rotor conductor pair are not shown. The contact areas on the surface of the same separated stator conductor half portion is grouped and commonly designated under a single alphabetical reference placed on corresponding conducting plates 33. Because there are three stator conductors in this embodiment, there are three such groups: a B group including contact areas B', B'', and B'''; a C group including contact areas C', C'', and C'''; and a D group including contact areas D', D'', and D'''. Each group represents all the contact areas on a corresponding separated stator conductor half portion; the B group for the half portion of a first stator conductor; the C group for the half portion of a second stator conductor; and the D group for the half portion of a third stator conductor. For each group B, C, and D, there is a corresponding group of three contact areas on the surface of the other separated stator conductor half portion of the same stator conductor, which other half portion is not shown in FIG. 3. Because all contact areas shown are on the same half portion of respective stator conductors, they all either supply current from or return current to their corresponding separated stator conductor half portion. Whatever is the case, their counterparts connecting to the other half portion of the same stator conductor would have the opposite function.

In the embodiment shown in FIG. 4, the three contact areas in each group are generally evenly distributed around the circumference of corresponding stator conductor half portions along the illustrated cross section. The generally even distribution is conducive to a more even current flow into or out of the stator conductor half portion, whichever is the case, than that obtained with a less even distribution of the same contact areas. Also, the higher the number of contact areas around the cross sectional circumference, the more even that current flow would be. Because each group of three contact areas is offset from the other two, all nine contact areas of three groups can be seen in the cross sectional view. Accordingly, the conducting plates 33 connecting to each group B, C, and D, of three contact areas (B', B'', and B'''), (C', C'', and C'''), and (D', D'', and D''') collectively represent either a source port or a sink port of the output terminal associated with the corresponding stator conductor on which half portion the contact areas in the group are located. Each port shown in FIG. 4, together with a port of the opposite function associated with the other separated half portions of each stator conductor (not shown), represents an independent output terminal of the homopolar generator. The plurality of independent terminals can be externally connected in series or in parallel to provide a selectable output from the homopolar generator. Alternatively, each output terminal can separately supply an output.

I claim:

1. A homopolar dynamoelectric machine comprising:
   means for generating magnetic flux;
   a plurality of rotor conductors mutually insulated from each other and each being mounted for motion relative to the direction of said generated magnetic flux;
   each of said plurality of rotor conductors having a surface area cutting across said generated magnetic flux during said relative motion for generating current in each of said rotor conductors;
   a plurality of stator conductors mutually insulated from each other and each being connected to a different associated one of said plurality of rotor conductors;
   the polarity of said generated magnetic flux cut by each of said rotor conductors, relative to the direction of motion of each of said rotor conductors with respect to said generated magnetic flux, does not change at any time during operation of the homopolar dynamoelectric machine;
   whereby plural independent output terminals each separately supplying a direct current provided by respective connections to each of said stator conductors.

2. A homopolar dynamoelectric machine as recited in claim 1, wherein:
   said relative motion is rotational motion.

3. A homopolar dynamoelectric machine as recited in claim 2, wherein:
   said rotor conductors rotate simultaneously for at least some of the time during operation of said homopolar dynamoelectric machine.

4. A homopolar dynamoelectric machine as recited in claim 3, wherein:
   each of said rotor conductor is a shell of generally cylindrical shape, and is rotatable about a longitudinal axis of its generally cylindrical shape.

5. A homopolar dynamoelectric machine as recited in claim 4, wherein:
   each said stator conductor is a shell of generally cylindrical shape and is composed of two portions separated along a plane generally perpendicular to the longitudinal axis of said generally cylindrical shape.

6. A homopolar dynamoelectric machine as recited in claim 5, wherein:
   said rotor conductors are mounted on a single rotor, and are coaxial to each other; the geometric centers of all said rotor conductors being coincident;
   said rotor imparting simultaneous rotational motion to all said rotor conductors.

7. A homopolar dynamoelectric machine as recited in claim 6, wherein:
   each said stator conductors are coaxial to each other and to all said rotor conductors; and
   the geometric centers of all said stator conductors and all said rotor conductors being coincident.

8. A homopolar dynamoelectric machine as recited in claim 7, further comprising:
   a plurality of pairs of a first and a second brush, each said pair connecting one of said plurality of rotor conductors with an associated one of said plurality of stator conductors;
   said first brush of each pair connecting each of said rotor conductors to one location of each associated stator conductor, and said second brush connecting each of said rotor conductors to a different location on said associated stator conductor.

9. A homopolar dynamoelectric machine as recited in claim 8, wherein:
   each brush in each pair of brushes has an annular configuration, circumscribes the rotor conductor to which it connects, and engages the generally cylindrical surface of the rotor conductor at an offset from each other in the longitudinal direction of the generally cylindrical shape.

10. A homopolar dynamoelectric machine as recited in claim 6, wherein:
    at least a portion of the surface area on each said rotor conductor is skewed to provide a generally skewed current path in a direction at a non-zero angle from an axis parallel to the longitudinal axis of the of each of said rotor conductor's shell;
    said skewed surface area is covered by an added layer of support structure for preventing damage to the skewed rotor conductor surface during rotation.

11. A homopolar dynamoelectric machine as recited in claim 2, 3, 4, 5, 6, 7, 8, 9, or 10, further comprising:
    a plurality of independent output terminals each separately connected to a different on one of said stator conductors.

12. A homopolar dynamoelectric machine as recited in claim 11, wherein:
    each of said output terminal includes a source port which corresponds to one of said plurality of stator conductors for supplying current out of said stator conductor and a sink port for receiving current into said stator conductor;

said source and sink ports of each of said output terminals respectively making contact with stator conductor at a different on said stator conductor.

13. A homopolar dynamoelectric machine as recited in claim 1, further comprising:
a plurality of independent output terminals each separately connected to and associated with one of said plurality of stator conductors;
each of said independent output terminals includes a source port supplying current out of its associated stator conductor and a sink port receiving current into said associated stator conductor;
said source and sink ports of each of said output terminals respectively making contact with said associated stator conductor at different locations of said associated stator conductor.
the connection between each source port and each sink port to said associated stator conductor includes plural contact areas of said associated stator conductor.

14. A homopolar dynamoelectric machine comprising:
means for generating magnetic flux;
a plurality of mutually electrically insulated rotor conductors each being in the form of a shell of generally cylindrical shape and being rotatable about a longitudinal axis of the generally cylindrical shape; each of said rotor conductors having a surface area cutting across said generated magnetic flux during its rotational motion; said rotor conductors rotate simultaneously for at least some of the time during operation of said homopolar dynamoelectric machine;
a plurality of mutually insulated stator conductors each being in the form of a shell of generally cylindrical shape; each of said stator conductors being composed of two portions separated along a plane generally perpendicular to the longitudinal axis of said generally cylindrical shape; both separated portions of each of said stator conductors being connected to a single rotor conductor associated with each of said stator conductors;
a plurality of output terminals each separately connected to a different stator conductor;
each of said plurality of output terminals includes a source port supplying current out of the dynamoelectric machine and a sink port receiving current into the dynamoelectric machine;
said source and sink port of each of said output terminals respectively contacting a different one of said separated portions of same stator conductor;
the connection between each source port and each sink port to a corresponding separated stator conductor portion includes plural contact areas on the surface of said corresponding separated stator conductor portion;
said plural contact areas are generally evenly distributed on a cross-section of the corresponding separated stator conductor portion.

* * * * *